United States Patent [19]
Nishi

[11] Patent Number: 6,075,616
[45] Date of Patent: Jun. 13, 2000

[54] PRINTER APPARATUS

[75] Inventor: Akihiro Nishi, Nara, Japan

[73] Assignee: Minolta Co., Ltd., Osaka, Japan

[21] Appl. No.: 08/188,925

[22] Filed: Jan. 31, 1994

[51] Int. Cl.[7] .................................................. G06F 15/00
[52] U.S. Cl. ........................................ 358/1.15; 358/1.14
[58] Field of Search .................................. 395/113, 114,
395/115, 116; 358/437, 444, 426, 261.1,
261.2, 261.3, 427, 296, 1.14, 1.15, 1.16,
1.17

[56] References Cited

U.S. PATENT DOCUMENTS

| | | |
|---|---|---|
| 4,777,620 | 10/1988 | Shimoni et al. |
| 4,860,119 | 8/1989 | Maniwa et al. .......................... 358/296 |
| 4,881,180 | 11/1989 | Nishiyama . |
| 4,920,427 | 4/1990 | Hirata ...................................... 358/437 |
| 4,979,132 | 12/1990 | Sugimoto .................................. 395/113 |
| 5,220,645 | 6/1993 | Nakajima ................................... 395/113 |

*Primary Examiner*—Dov Popovici
*Attorney, Agent, or Firm*—Burns, Doane, Swecker & Mathis, LLP

[57] ABSTRACT

A printer apparatus which includes a data processing system for forming an output image data DI in a page unit by analyzing a print data DO inputted from an external device, and an image forming system for printing an image corresponding to the output image data DI on a paper sheet, in which, upon occurrence of a trouble which is related to the image forming system and by which sending of the output image data DI to the image forming system should be retained, the data processing system memorizes the print data DO through compression, and after disappearance of the trouble, expands the print data DO in the compressed state for use in the formation of the output image data DI.

29 Claims, 7 Drawing Sheets

PRINTER APPARATUS

BACKGROUND OF THE INVENTION

Field of the Invention

The present invention generally relates to a printer and more particularly, to a printer apparatus of a page print type.

In recent years, a so-called page printer capable of printing at high quality and high speed as compared with the serial printer or the like, has come to be widely employed as a printing means for the information processing system.

The page printer as referred to above generally includes a data processing system which forms an output image data in a page unit based on a print data sent from an external host computer, and an image forming system which forms an image corresponding to the output image data on a paper sheet by a known electrophotographic process. The data processing system is constituted by a processor, a receiving buffer, and a bit map memory, etc., while the image forming system is constituted by an electrostatic latent image holder such as a photoreceptor drum, various chargers, a fixing device, and paper transport mechanisms, etc.

Upon turning on a power supply through operation of a power switch by an operator, the page printer is brought into a stand-by state waiting for input of print data (image data/control command) through initialization and warming up of various parts.

When the print data is inputted, the data processing system reads the print data in the order of reception, while storing said data in the receiving buffer, and draws the output image on a bit map memory through analysis of the control command, and after drawing of 1 page, reads out the output image data from the bit map memory for transfer thereof to the image forming system. In the case where the number of pages of the printing is in plurality, the data processing system immediately starts the drawing of the output image for the next page after transfer of the output image data for one page.

Meanwhile, along with the drawing of the output image, the image forming system takes out one sheet of copy paper from a paper cassette or the like for standing-by at a so-called register position in a transport passage, and thereafter, requests transfer of the output image data with respect to the date processing system. Upon receipt of the output image data, the image forming system starts formation of an electrostatic latent image, and successively transports copy paper sheets to a transfer position and a fixing position in timed relation to the progress of the image forming process thereafter for subsequent discharge of the copy paper sheet out of the printer.

In the data processing system of a conventional page printer, after completion of the drawing of the output image for one page (referred to as "bit map development" hereinafter), if the data transfer is not requested from the image forming system, the data processing system stands by, with substantial processing for the print data being suspended in a state where the output image on the bit map memory is maintained. In other words, even when the print data for the next page is present on the receiving buffer, the data processing system does not effect reading and bit map development thereof. However, storing of the print data into the receiving buffer is continued, and when the receiving buffer is filled up, notification of a busy state (i.e., state incapable of receiving) is given to the host unit.

Incidentally, in case where a state incapable of printing takes place due to "paper jamming" or "paper empty" in which the paper sheet accommodating cassette becomes empty, the image forming system of the page printer does not request data transfer to the data processing system until the trouble is removed.

More specifically, in the conventional arrangements, upon occurrence of the trouble in the image forming system, since reading of the receiving buffer is suspended at a time point when the bit map development for one page is completed, in the case where a large amount of print data exceeding the buffer capacity is inputted, the state of the page printer as observed from the host computer becomes busy, and when the working time for dealing with the trouble by the operator is included, such busy state is to continue for a comparatively long period of time.

Accordingly, in the conventional arrangements, there have been such problems that the completion of sending out the print data is undesirably delayed at the side of the host computer, thus resulting in lowering of the processing efficiency. Moreover, in the case where the host computer suspends sending out of the print data as a time out error processing at the time point when the busy allowable time has passed, even if the printing function is resumed through disappearance of the trouble in the image forming unit, no printing is effected with respect to the print data suspended to be sent out, and thus, the operator is required to give a printing instruction again to the host computer. Although an increase of the memory capacity for the receiving buffer may be considered for solving such a problem, there has been a limitation to the increase of capacity in the actual practice from the aspects of cost and space.

SUMMARY OF THE INVENTION

Accordingly, an object of the present invention is to provide a printer apparatus and a printing method in which it is intended to suppress occurrence of a state incapable of receiving print data due to trouble in an image forming system as far as possible, with substantial elimination of disadvantages inherent in the conventional arrangements and methods of this kind.

Another object of the present invention is to provide a printer apparatus of the above described type which is simple in construction and stable in functioning at high reliability, and can be readily manufactured at low cost, and a printing method applicable to said printer apparatus.

In accomplishing these and other objects, according to the present invention, there is provided a printer apparatus which includes a data processing system for forming an output image data DI in a page unit by analyzing a print data DO inputted from an external device, and an image forming system for printing an image corresponding to said output image data DI on a paper sheet, wherein, upon occurrence of a trouble which is related to the image forming system and by which sending of the output image data DI to the image forming system should be retained, the data processing system memorizes the print data DO through compression, and after disappearance of the trouble, expands the print data DO in the compressed state for use in the formation of said output image data DI.

There is also provided a printer apparatus which includes a data processing system for forming an output image data DI in a page unit by analyzing a print data DO inputted from an external device, and an image forming system for printing an image corresponding to the output image data DI on a paper sheet, wherein, upon occurrence of a trouble which is related to the image forming system and by which sending of the output image data DI to the image forming system should be retained, the data processing system continues the formation of the output image data DI, and also, memorizes the formed output image data DI through compression, and after disappearance of the trouble, expands the output image data DI in the compressed state for sending thereof to the image forming system.

In the above arrangement according to the present invention, the data processing system memorizes, through compression, the print data successively received from external devices or output image data corresponding thereto in the case where a trouble takes place in the image forming system, thereby making it impossible to send the output image data to the image forming system. Thus, a larger amount of print data may be received, and occurrence of the state incapable of receiving can be suppressed as far as possible.

Upon elimination of the trouble, the data processing system expands the print data or output image data in the compressed state, and effects formation of the output image data or sending of the expanded output image data to the image forming system in the manner similar to the normal case.

More specifically, according to one aspect of the present invention, the print apparatus is arranged to actuate an image forming means based on a received print data for printing an image based on the print data, and includes a detecting means for detecting trouble in the image forming means, a compressing means for compressing the received print data upon detection of the trouble, a memory means for memorizing the compressed data, an expanding means for expanding data read from said memory means, and a control means which controls to instruct starting of said expanding means after elimination of the trouble, and also, to print the image by the image forming means based on the expanded data.

In another aspect of the present invention, the image forming apparatus comprises a preparing means for preparing print image data by analyzing print data applied from an external device, a first memory means for memorizing the prepared print image data, a print means for printing an image based on the print image data read from the first memory means, a detecting means for detecting trouble of the print means, a compressing means for compressing the print data inputted from said external device when the trouble of the print means is detected, a second memory means for memorizing the compressed data, an expanding means for expanding the data read from said second memory means, an output means for outputting the expanded data to said preparing means so as to prepare the print image data from the expanded data, and a transmitting means for transmitting the prepared print image data to said print means.

In a further aspect of the present invention, the image forming apparatus includes a preparing means for preparing print image data by analyzing print data applied from an external device, a first memory means for memorizing the prepared print image data, a print means for printing an image based on the print image data read from the first memory means, a detecting means for detecting trouble of the print means, a compressing means for compressing the print image data prepared by said preparing means when the trouble of the print means is detected, a second memory means for memorizing the compressed data, an expanding means for expanding the data read from said second memory means, and a transmitting means for transmitting the expanded data to said print means.

In still another aspect of the present invention, there is provided a dumb printer which includes a receiving means for receiving print image data from an external device, a print means for printing an image based on the received print image data, a detecting means for detecting trouble of said print means, a compressing means for compressing the print data to be received when the trouble of the print means is detected, a memory means for memorizing the compressed data, an expanding means for expanding the data read from said memory means, and an output means for outputting the expanded data to the print means for printing the image.

In a still further aspect of the present invention, there is provided an image printing method arranged to prepare print image data by analyzing the print image data received from an external device by a data processing system, and to print an image based on said print image data by an image forming system. The image printing method includes the steps of detecting trouble in the image forming system, compressing the print data received from the external device when trouble is detected, memorizing the compressed data in a memory means, expanding data read from the memory mens after the trouble has been eliminated, preparing print image data by analyzing the expanded data, and printing the image based on the prepared print image data by the image forming system.

In another aspect of the present invention, the image forming apparatus includes a compressing means for compressing print data received from an external device, a memory means for memorizing the compressed data, an expanding means for expanding data read from the memory means, and a print means for printing an image based on data outputted from the expanding means.

In a further aspect of the present invention, there is provided an image printing method arranged to actuate an image forming means based on received print data, and to print the image based on said print data. The image printing method includes the steps of detecting trouble of the image forming means, compressing the received print data when trouble is detected, memorizing the compressed data in a memory means, expanding data read from the memory means after the trouble has been eliminated, and printing the image by the image forming means based on the expanded data.

BRIEF DESCRIPTION OF THE DRAWINGS

These and other objects and features of the present invention will become apparent from the following description taken in conjunction with the preferred embodiment thereof with reference to the accompanying drawings in which.

DETAILED DESCRIPTION OF THE INVENTION

Figure 1:
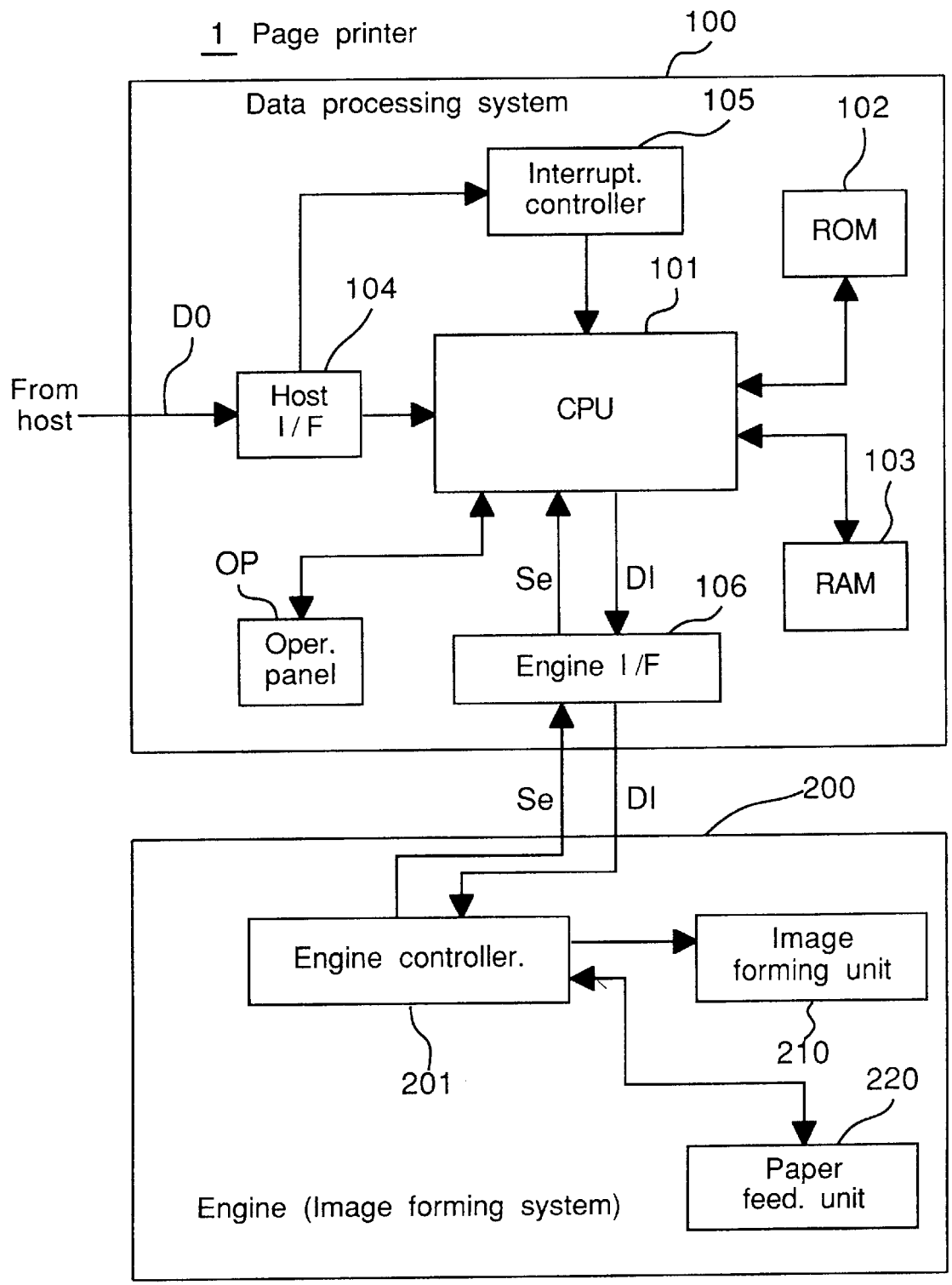
FIG. 1 is a block diagram showing a general construction of a page printer according to the present invention.

Before the description of the present invention proceeds, it is to be noted that like parts are designated by like reference numerals throughout the accompanying drawings.

Referring now to the drawings, there is shown in FIG. 1, a block diagram showing a construction of a page printer 1 according to one preferred embodiment of the present invention, which generally includes a data processing system 100 for outputting an output image data DI by analyzing a print data DO inputted from an external host computer, and an engine (image forming system) 200 for printing an image corresponding to the output image data DI on a paper sheet.

The data processing system 100 includes a CPU (central processing unit) 101 for controlling said system, and a ROM (read only memory) 102 storing programs, a RAM (random access memory) 103 for temporarily memorizing various data, a host interface 104 for communication with a host computer, an interruption controller 105, an operating panel OP which is a man/machine interface, and an engine interface 106, etc., which are coupled with the CPU 101 as shown. The interruption controller 105 requests execution of the receiving processing (to be described later) with respect to the CPU 101 in response to input of the print data DO.

It is to be noted here that the CPU 101 plays a part of a print controller for managing the overall function of the page printer 1, while the RAM 103 is used as a receiving buffer and a frame buffer (bit map area), etc.

On the other hand, the engine or image forming system 200 is constituted by an engine controller 201, an image forming unit 210 for carrying out an electrophotographic processing, and a paper feeding unit 220 for dealing with transport of paper sheets. This paper feeding unit 220 is provided with sensors for detecting a paper empty state, paper size and paper jamming, respectively.

Figure 2:
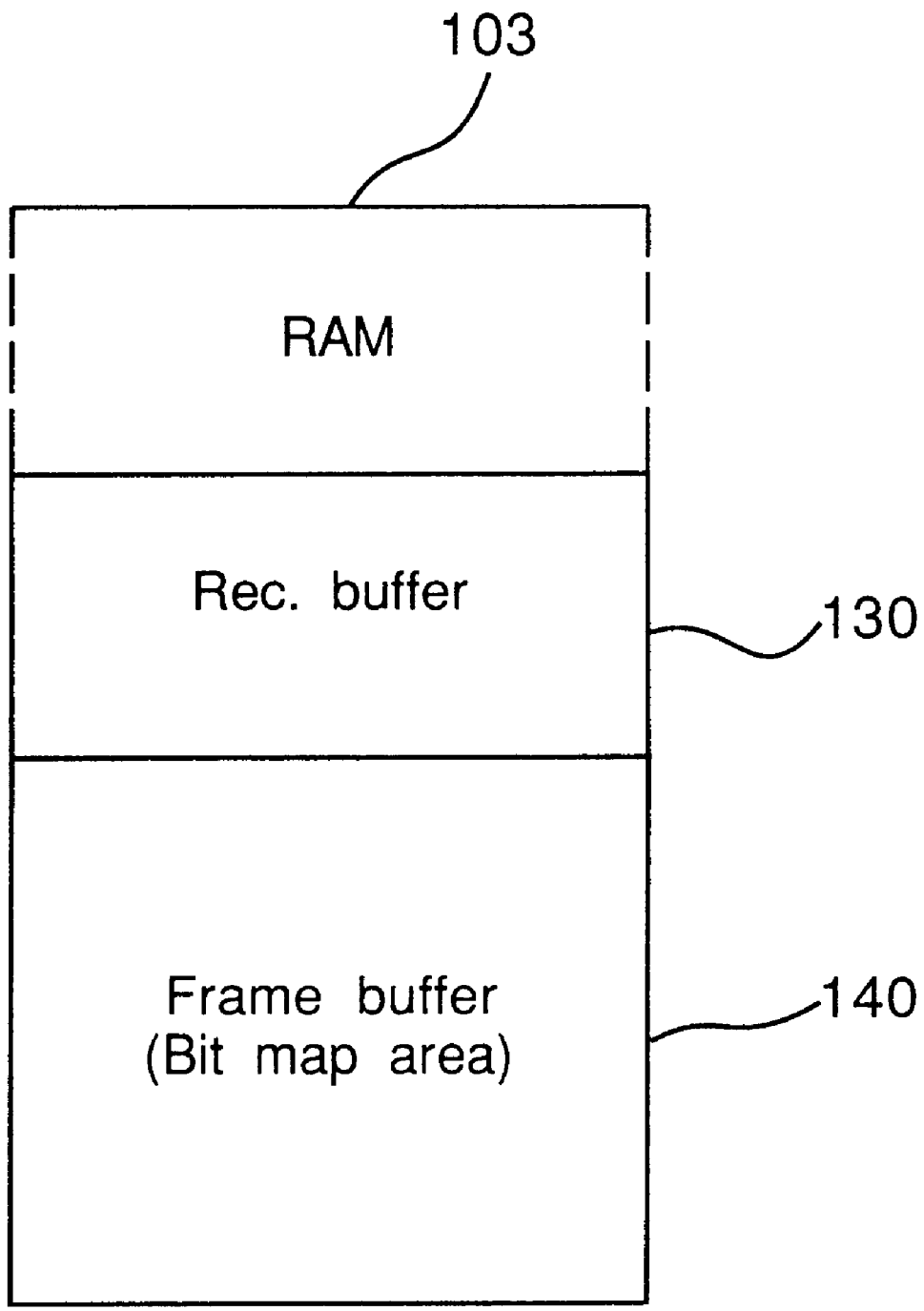
FIG. 2 is a diagram for explaining one example of a state of use of a RAM employed in the arrangement of FIG. 1.

In the page printer 1 according to the present invention having hardware constructions as described above, the print data DO inputted to the host interface 104 is stored in a receiving buffer 130 provided by sectioning a memory space of the RAM 103 as shown in FIG. 2.

The CPU 101 sequentially reads the print data DO from the receiving buffer 130 for analysis, and for example, interprets a print instruction content based on a page describing language, and effects a bit map development of the output image on a frame buffer 140 within the RAM 103.

Upon completion of the bit map development for one page, the CPU 101 transfers the output image data DI of the frame buffer 140 to the engine controller 201 through the engine interface 106.

The engine controller 201 controls the image forming unit 210 and paper feeding unit 220 by receiving the output image data DI, and starts printing of the hard copy image corresponding to the output image data DI.

Normally, since the bit map development of the output image and reproduction on the paper sheet are continuously effected as described above and the print data DO is successively read from the receiving buffer 130, there is no obstruction to the input of the print data DO if the capacity of the receiving buffer 130 is properly selected according to the printing speed.

Incidentally, in the case where a state incapable of forming images (i.e., engine error state) takes place due to troubles at the engine side such as occurrence of a paper size error in which the paper sheets designated by the print data DO are not loaded, or generation of paper empty state or paper jamming in the course of printing a plurality of pages, the data processing system 100 is required to retain the transfer of the output image data DI in order to avoid disappearance of the image information inputted from the host computer. In other words, it is impossible to convert the print data DO within the receiving buffer 130 into the output image data DI and transfer to the engine 200.

In the case as referred to above, the data processing system 100 compresses and memorizes the print data DO or output data DI as a processing for avoiding denial of reception of the print data DO due to the reason that the receiving buffer 130 has been filled up. Thus, upon disappearance of the engine trouble, when the state in which the transfer of the output image data DI is permitted, is reestablished, the data in the compressed state is expanded into the original data, and the bit map development or transfer of the output image data DI is resumed in the usual manner.

Figure 3:
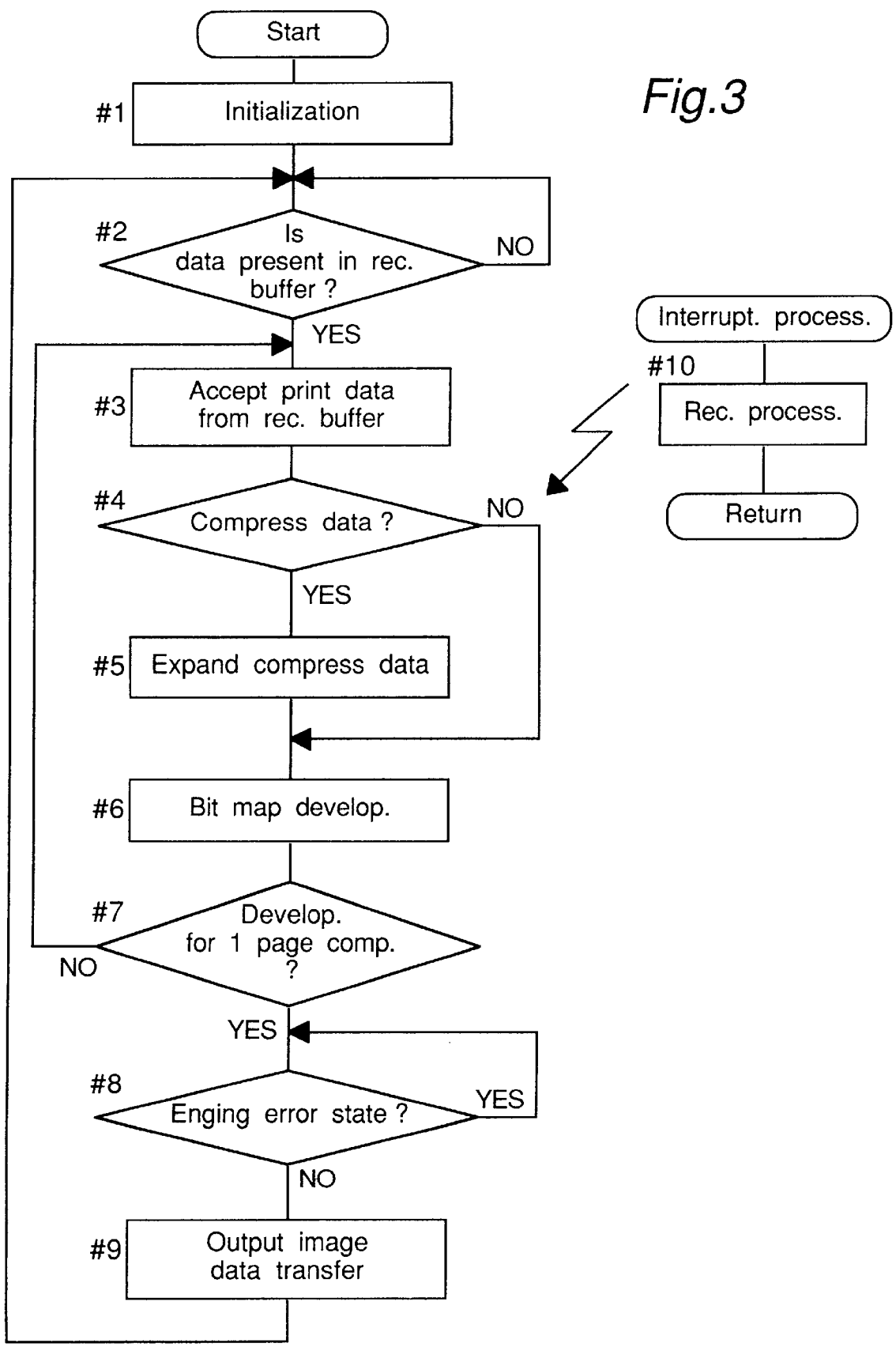
FIG. 3 is a main flow chart for explaining one example of a function of a CPU in the arrangement of FIG. 1.

Subsequently, functions of the page printer 1 will be explained based on flow-charts in FIGS. 3 to 7, in which FIG. 3 is a main flow chart showing one example of functioning of the CPU 101.

Upon turning on the power supply, the CPU 101 first effects internal initialization (Step #1), and then, executes a series of processings (Steps #2 to #9) for printing to be described later. Meanwhile, the CPU 101 executes the receiving processing (Step #10) which is an interruption sub-routine, in response to an interruption request by the interruption controller 105.

Figure 4:
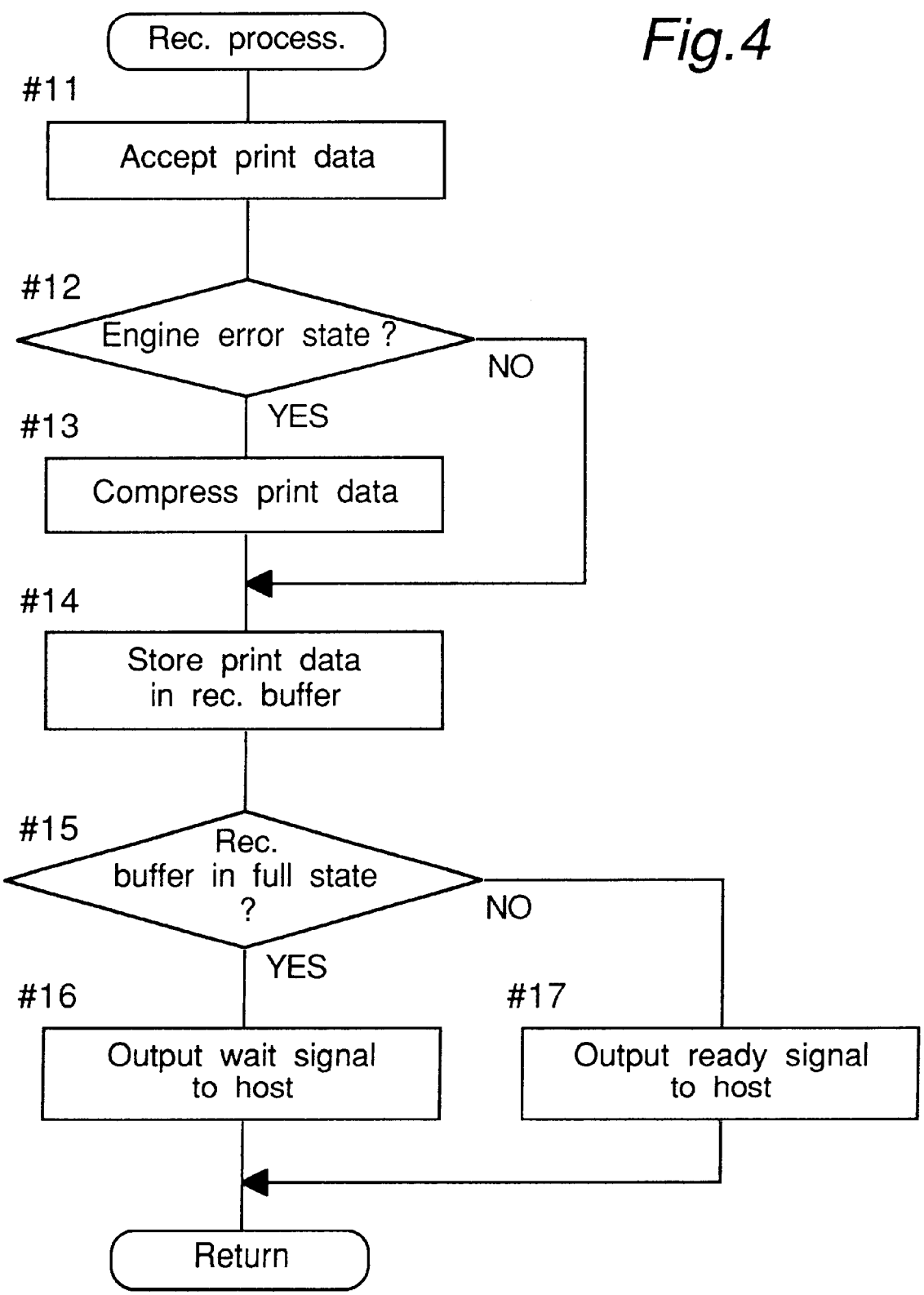
FIG. 4 is a flow chart for explaining a receiving processing in the arrangement of FIG. 3.

FIG. 4 is a flow-chart for explaining a receiving processing in the arrangement of FIG. 3.

When this routine is called in response to the input of the print data DO, the CPU 101 normally takes in the print data DO of one transmission unit length as received by the host interface 104, and once stores the same in the receiving buffer 130 as it is (Steps #11 and #14).

On the contrary, in the case of the engine error state, data compression of the print data DO is effected for improving working efficiency of the receiving buffer 130, and the print data DO under the compressed state is stored in the receiving buffer 130 (Steps #12, #13 and #14). It is to be noted that checking as to whether or not the engine is in the error state here is to be effected by the presence or absence of an error generation notifying signal Se which is outputted by the engine control section 201 during occurrence of the trouble. Meanwhile, the data compression is effected by a code conversion compression method which converts comparatively redundant character codes into codes with less bit number, or a keyword compression method for replacing a specific character row by one code, etc.

Thus, when the receiving buffer 130 becomes full, a wait signal indicating the busy state is outputted with respect to the host computer so as to return to the main routine, while, if the receiving buffer 130 is not in the full state even after storing of the data, a ready signal indicating that reception of the print data DO is possible is outputted with respect to the host computer so as to return to the main routine (Steps #15 to #17).

Referring back to FIG. 3, the CPU 101 waits for the interruption request by the interruption controller 105 (Step #2) after the initialization, and upon returning to the main routine by storing the print data DO in the receiving buffer 130 in response to the interruption request, immediately takes in the print data DO of a specific data length from the receiving buffer 130 (Step #3).

If the print data DO thus taken in is of a compression data, the analysis is effected after data expansion, while when the print data DO taken in is of a non-compression data, the analysis is immediately effected as it is, and the bit map development in which the output image composed of dot patterns of characters and figures is drawn on the frame buffer 140 is started (Steps #4 to #6).

At the time point when the bit map development for one page is completed by repeating the taking-in of the print data DO, data expansion according to necessity, and bit map development, the CPU 101 checks as to whether or not the engine error state is present (Steps #7 and #8).

In the case of the engine error state, the CPU 101 stands by, with the data of the frame buffer 140 retained. However, if the interruption request is given during the standing-by, the CPU 101 stores the print data DO in the receiving buffer 130.

On the other hand, if the state is not of the engine error state (including the case where the normal state in which the transfer of the output image data DI is permitted, has been established, with the trouble at the engine side being eliminated), the output image data DI for one page is transferred to the engine 200 from the frame buffer 140 in response to the data transfer request by the engine 200 (Step #9).

Then, the procedure returns to Step #2, and when the print data DO corresponding to the print data DO of the next page or the print data DO corresponding to the next print request (job) is present in the receiving buffer 130, the bit map development for one page is again started.

Figure 5:
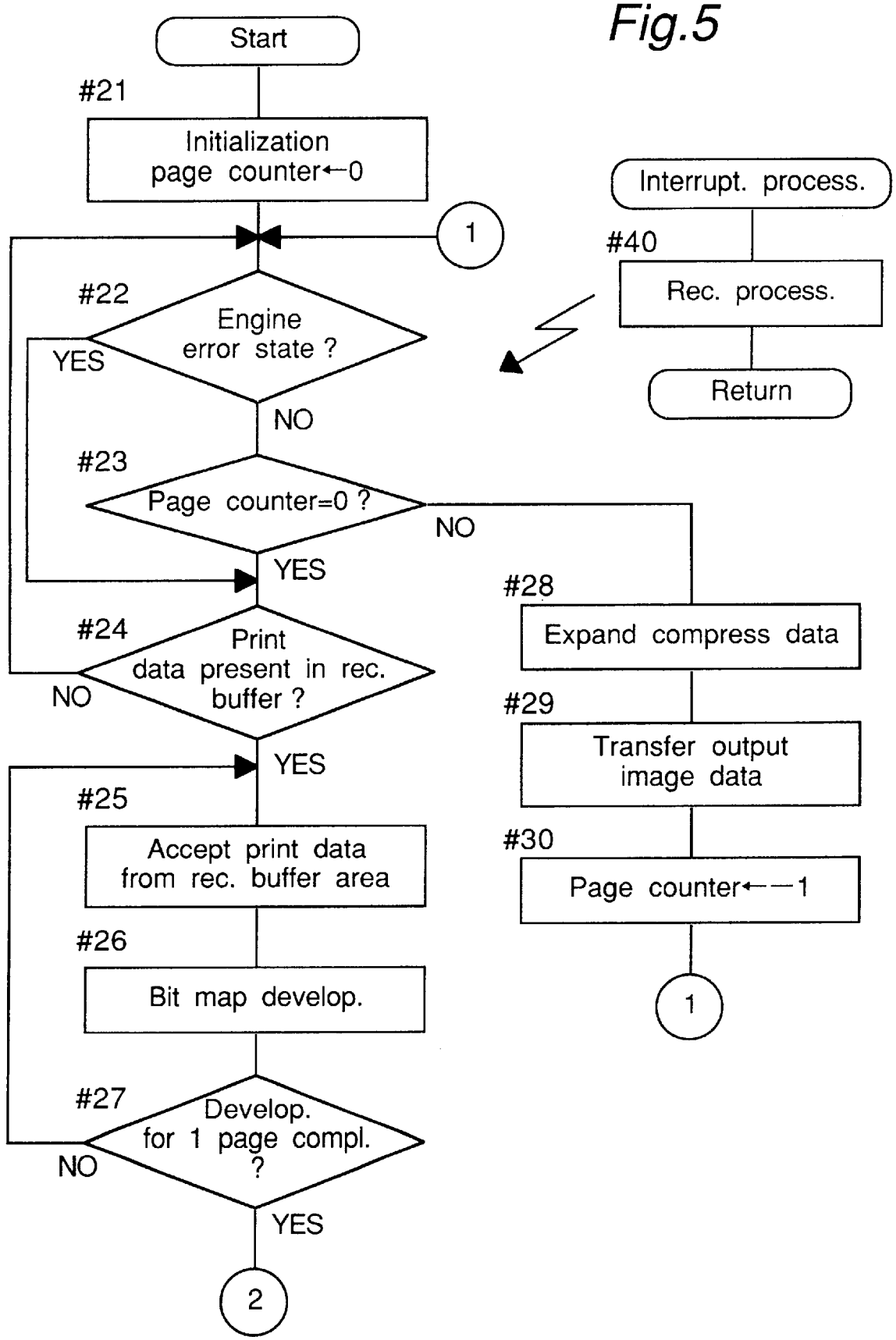
FIG. 5 is a main flow chart similar to FIG. 3, which particularly shows another function of the CPU.
Figure 6:
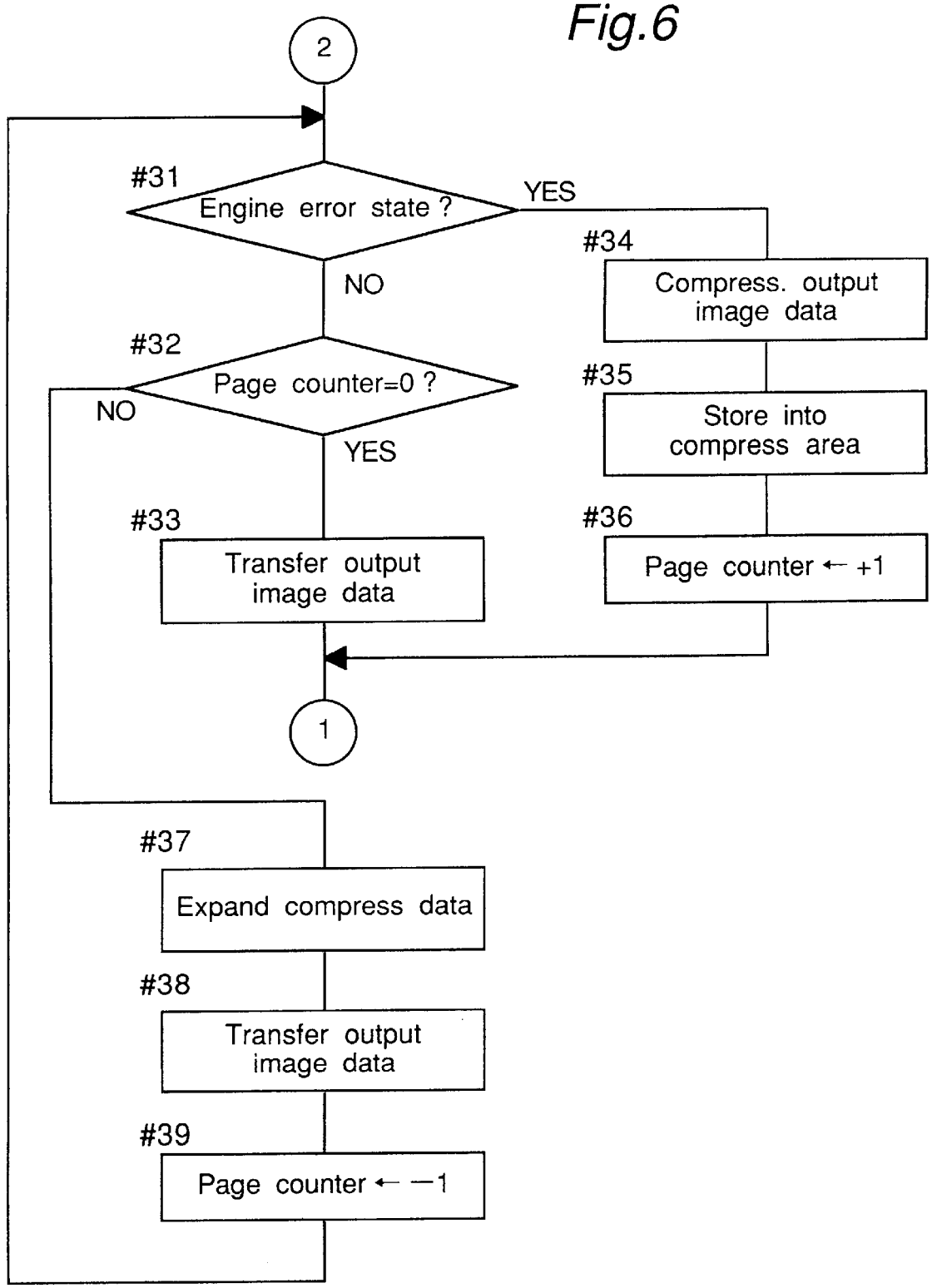
FIG. 6 is also a main flow chart similar to FIG. 3, which particularly shows still another function of the CPU.

Reference is further made to FIGS. 5 and 6 giving main flow charts showing other examples of functions for the CPU 101.

Figure 8:
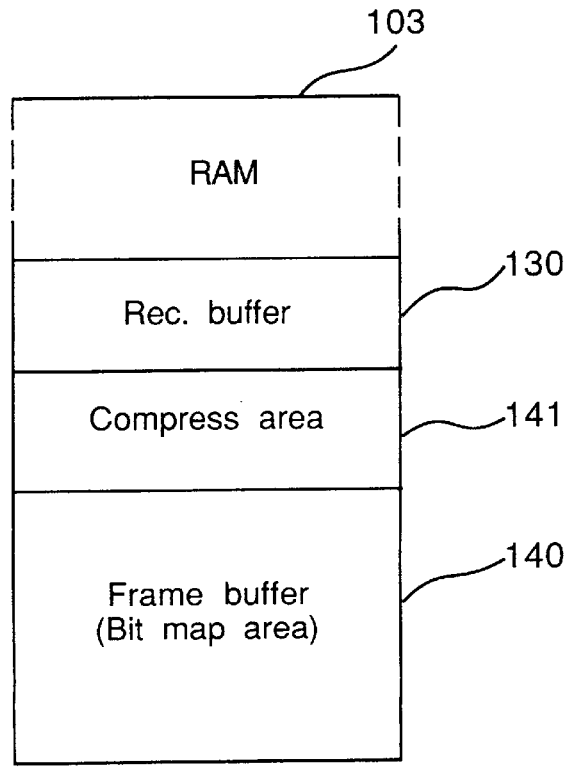
FIG. 8 is a diagram similar to FIG. 2, which particularly shows another example of a state of use of the RAM.

In FIGS. 5 and 6, upon turning on the power supply, the CPU 101 first effects the initialization of work area including resetting of the page counter (Step #21). The page counter is arranged to show ho many pages of data are stored in a compression area 141 provided with the RAM 103 together with the receiving buffer 130 and frame buffer 140 as shown in FIG. 8.

After the initialization, the CPU 101 executes a series of processings (Step #22 to #39) to be described later, and during that time, effects the receiving processing (Step #40) in response to the interruption request by the interruption controller 105.

It should be noted here that in the case where the engine error state is not detected, for example, at Steps #12, #22, and #31, etc., a signal indicating that the engine trouble has been eliminated is outputted.

Figure 7:
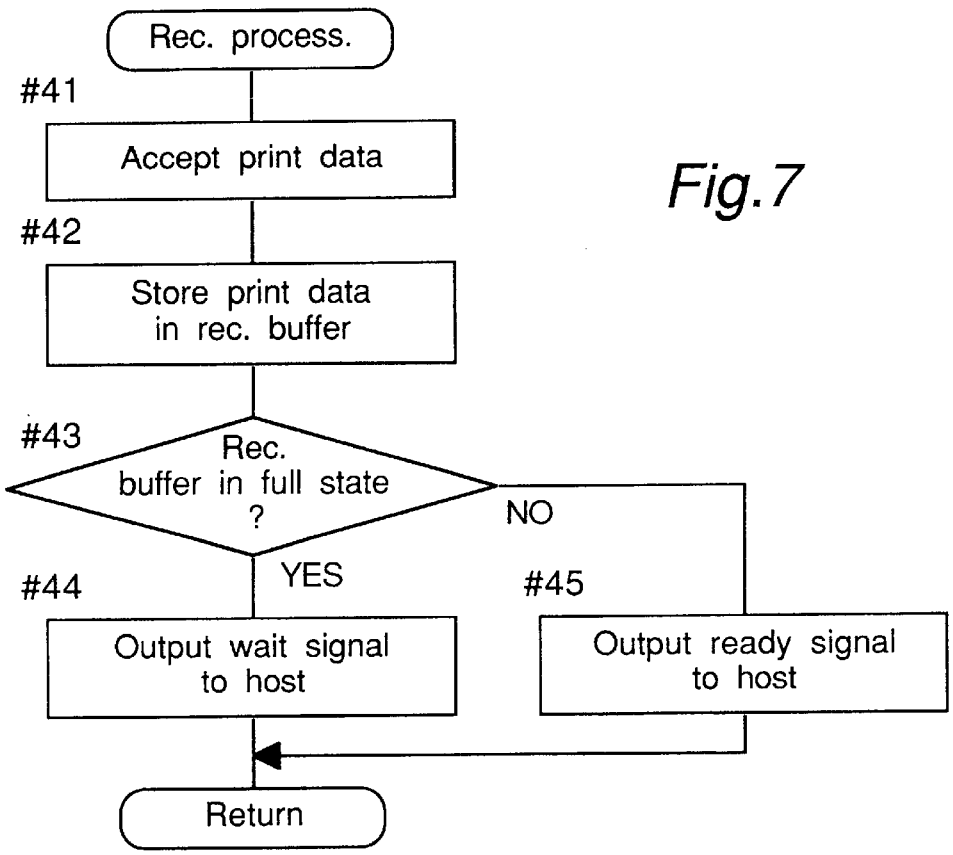
FIG. 7 is a flow chart for explaining a receiving processing in the arrangement of FIG. 5.

FIG. 7 shows a flow-chart for explaining the receiving processing in FIG. 5.

In this routine, the CPU 101 takes in the print data DO received by the host interface 104, and once stores said data in the receiving buffer 130 (Steps#41 and #42).

When the receiving buffer 130 is filled up by the storing of the print data DO, the CPU 101 outputs the wait signal indicating the busy state with respect to the host computer to return to the main routine, while when the receiving buffer 130 is not in the filled up state even after the storing of the data, the CPU 101 outputs the ready signal indicating that the reception of the print data DO is possible with respect to the host computer so as to return to the main routine (Steps #43 to #45).

Referring back to FIG. 5, the CPU 101 first checks the state of the engine 200 after the initialization (Step #22).

In the case where the engine 200 is in the normal state, with the value of the page counter being zero, the CPU 101 takes in the print data DO from the receiving buffer 130 for analysis, and effects the bit map development for one page (Steps #23 to #27). Meanwhile, when the engine 200 is in the engine error state, the CPU 101 effects the bit map development regardless of the value of the page counter (Steps #22, #24 to #27).

At the time point when the bit map development for one page has been completed, the CPU 101 again effects the checking of the engine 200 (Step #31), and if the engine is in the normal state, transfers the output image data DI (bit map data) to the engine 200 from the frame buffer 140 at predetermined timing.

Meanwhile, if the engine is in the engine error state, the CPU 101 reads the output image data DI from the frame buffer 140 by the predetermined data length, and effects the data compression based on the MH system or MR system or the like widely used, for example, in the facsimile transmision, and thus, stores the output image data DI after the compression in the compression area 141 for increment of the page counter (Steps #31, #34 to #36). Then, the CPU 101 returns to the Step #22 in FIG. 5, and if there is the print data DO in the receiving buffer 130, effects the next bit map development.

More specifically, in the embodiment of FIGS. 5 and 6, in the case of the engine error state in which the transfer of the output image data DI from the data processing system 100 to the engine 200 is not allowed, the CPU 101 repeatedly executes the function wherein it successively reads the print data DO sequentially applied from the hot computer and stored in the receiving buffer 130, from said receiving buffer 130 for conversion into the output image data DI so as to subsequently compress said data for storing. By the above processing, the receiving buffer 130 is to be used in a state generally similar to the normal state, i.e., in the state where reading is effected along with the storing of the print data DO, and thus, input of the print data DO may be smoothly effected.

Thereafter, when the trouble is removed and the engine 200 is brought into the normal state, the CPU 101 repeats expansion of the compressed output image data DI, transfer of the output image data DI after the expansion to the engine 200, and decrement of the page counter until the value of the page counter becomes zero, and resumes the printing as requested by the host computer.

According to the embodiment of FIGS. 5 and 6, in the printing of a plurality of pages, the bit map development of each page may be effected even during the period of the engine error, thereby to substantially effected processing for the printing, and therefore, it is possible to rapidly resume the printing after returning to the normal state. In other words, the working efficiency of the data processing system may be improved.

It should be noted here that the present invention is not limited in its application to the printer apparatus of the type in which the output image data is prepared by analyzing the print data received from outside, but may be readily applied to an apparatus of a type which directly receives the output image data from outside.

As is clear from the foregoing description, according to the present invention, in the case where a trouble takes place in the image forming system, and thus, the output image data can not be sent from the data processing system to the image forming system, a larger amount of print data may be received, since the print data itself sequentially inputted or output image data corresponding thereto in the compressed state is memorized, occurrence of the state incapable of reception may be suppressed as far as possible.

Moreover, in another aspect of the present invention, at the resumption of the printing after removal of the trouble, since the expansion of the output image data in the compressed state is easier than the formation of the output image data in the data processing, higher speed of printing can be achieved.

Although the present invention has been fully described by way of example with reference to the accompanying drawings, it is be noted here that various changes and modifications will be apparent to those skilled in the art. Therefore, unless otherwise such changes and modifications depart from the scope of the present invention, they should be construed as included therein.

What is claimed is:

1. A printer apparatus arranged to actuate an image forming means based on a received print data for printing an image based on the print data, said printer apparatus comprising:
   a detecting means for detecting trouble in the image forming means,
   a compressing means for initiating the compression of the received print data upon detection of the trouble,
   a memory means for memorizing the compressed data,
   an expanding means for expanding data read from said memory means, and
   a control for instructing starting of said expanding means after elimination of the trouble and also, for printing the image by the image forming means based on the expanded data.

2. A printer apparatus as claimed in claim 1, wherein said image forming means has means for detecting an empty state of paper sheets for effecting the image formation.

3. A printer apparatus as claimed in claim 1, wherein said image forming means has means for detecting paper jamming therein.

4. An image forming apparatus which comprises:
   a preparing means for preparing print image data in accordance with print data received from an external device,
   a first memory means for memorizing the prepared print image data,
   a print means for printing an image based on the print image data read from the first memory means,
   a detecting means for detecting trouble of the print means,
   a compressing means for initiating the compression of the print data inputted from said external device when the trouble of the print means is detected,
   a second memory means for memorizing the compressed data,
   an expanding means for expanding the data read from said second memory means,
   an output means for outputting the expanded data to said preparing means so as to prepare the print image data from the expanded data, and
   a transmitting means for transmitting the prepared print image data to said print means.

5. An image forming apparatus as claimed in claim 4, wherein the print image data is of bit data.

6. An image forming apparatus as claimed in claim 4, wherein said first memory means memorizes the print image data per page unit.

7. An image forming apparatus as claimed in claim 4, wherein said print means has means for detecting an empty state of paper sheets for effecting the image formation.

8. An image forming apparatus as claimed in claim 4, wherein said print means has means for detecting paper jamming in an image forming means.

9. An image forming apparatus as claimed in claim 4, wherein said detecting means outputs a normal signal when trouble is not detected, and said expanding means is started based on the normal signal.

10. An image forming apparatus which comprises:
    a preparing means for preparing print image data in accordance with print data received from an external device,
    a first memory means for memorizing the prepared print image data,
    a print means for printing an image based on the print image data read from the first memory means,
    a detecting means for detecting trouble of the print means,
    a compressing means for initiating the compression of the print image data prepared by said preparing means when the trouble of the print means is detected,
    a second memory means for memorizing the compressed data,
    an expanding means for expanding the data read from said second memory means, and
    a transmitting means for transmitting the expanded data to said print means.

11. An image forming apparatus as claimed in claim 10, wherein the print image data is of bit data.

12. An image forming apparatus as claimed in claim 10, wherein said first memory means memorizes the print image data per page unit.

13. An image forming apparatus as claimed in claim 10, wherein said print means has means for detecting an empty state of paper sheets for effecting the image formation.

14. An image forming apparatus as claimed in claim 10, wherein said print means has means for detecting paper jamming in an image forming means.

15. An image forming apparatus as claimed in claim 10, wherein said detecting means outputs a normal signal when trouble is not detected, and said expanding means is started based on the normal signal.

16. A dumb printer which comprises:
    a receiving means for receiving print image data from an external device,
    a print means for printing an image based on the received print image data,
    a detecting means for detecting trouble of said print means,
    a compressing means for initiating the compression of the print data to be received when the trouble of the print means is detected,
    a memory means for memorizing the compressed data,
    an expanding means for expanding the data read from said memory means, and
    an output means for outputting the expanded data to the print means for printing the image.

17. A dumb printer as claimed in claim 16, wherein the print image data is of bit data.

18. A dumb printer as claimed in claim 16, wherein said print means has means for detecting an empty state of paper sheets for effecting the image formation.

19. A dumb printer as claimed in claim 16, wherein said print means has means for detecting paper jamming in an image forming means.

20. A dumb printer as claimed in claim 16, wherein said detecting means outputs a normal signal when trouble is not detected, and expanding means is started based on the normal signal.

21. An image printing method arranged to prepare print image data by analyzing the print image data received from an external device by a data processing system, and to print an image based on said print image data by an image forming system, said image printing method comprising the steps of:
    detecting trouble in the image forming system,
    initiating the compression of the print data received from the external device when trouble is detected, memorizing the compressed data in a memory means, expanding data read from the memory means after the trouble has been eliminated, preparing the print image data by analyzing the expanded data, and printing the image based on the prepared print image data by the image forming system.

22. A method as claimed in claim 21, wherein the step for detecting the trouble detects an empty state of paper sheet for effecting the image formation.

23. A method as claimed in claim 21, wherein the step for detecting the trouble detects paper jamming in an image forming means.

24. An image printing method arranged to actuate an image forming means based on received print data, and to print the image based on said print data, said image printing method comprising the steps of:

detecting trouble of the image forming means;

initiating the compression of the received print data when the trouble is detected, memorizing the compressing data in a memory means, expanding data read from the memory means after the trouble has been eliminated, and printing the image by the image forming means based on the expanded data.

25. A method as claimed in claim 24, wherein the print data is of the data formed by a page describing language.

26. A method as claimed in claim 24, wherein the print data is of bit data.

27. A method as claimed in claim 24, further including a step for preparing print image data by analyzing the print data.

28. A method as claimed in claim 24, wherein the step for detecting the trouble detects an empty state of paper sheet for effecting the image formation.

29. A method as claimed in claim 24, wherein the step for detecting the trouble detects paper jamming in the image forming means;

printing the image based on the prepared print image data by the image forming system.

* * * * *

UNITED STATES PATENT AND TRADEMARK OFFICE
CERTIFICATE OF CORRECTION

PATENT NO. : 6,075,616
DATED : June 13, 2000
INVENTOR(S) : A. NISHI

It is certified that error appears in the above-identified patent and that said Letters Patent is hereby corrected as shown below:

On the title page: Item

[30] Foreign Application Priority Data

Feb. 5, 1993 [JP] Japan....................5-018728

Signed and Sealed this

Seventeenth Day of April, 2001

*Attest:*

NICHOLAS P. GODICI

*Attesting Officer*     *Acting Director of the United States Patent and Trademark Office*